United States Patent
Masino et al.

(10) Patent No.: US 7,447,051 B2
(45) Date of Patent: Nov. 4, 2008

(54) SYNCHRONOUS MULTI-PHASE AC-TO-DC CONVERTER

(75) Inventors: James E. Masino, Houston, TX (US); Roger L. Schultz, Aubrey, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 485 days.

(21) Appl. No.: 10/962,849

(22) Filed: Oct. 12, 2004

(65) Prior Publication Data

US 2006/0077602 A1 Apr. 13, 2006

(51) Int. Cl.
*H02M 7/217* (2006.01)
*H02M 5/42* (2006.01)

(52) U.S. Cl. .............................. 363/127; 363/87; 363/89

(58) Field of Classification Search .................. 363/67, 363/68, 87, 88, 89, 125, 126, 127, 129; 323/237, 323/241, 244
See application file for complete search history.

(56) References Cited

U.S. PATENT DOCUMENTS

| | | | |
|---|---|---|---|
| 4,146,864 | A | 3/1979 | Maltby et al. |
| 5,301,072 | A | 4/1994 | Wilson |
| 5,631,813 | A * | 5/1997 | Ikeshita ........................ 363/37 |
| 6,451,055 | B1 | 9/2002 | Weiss |

OTHER PUBLICATIONS

Aksenenka, Victor, "One-Shot Provides Frequency Discrimination," www.edn.com; May 1, 2003, 2 pgs.
Bosque, Guillermo, "Design An Efficient Reset Circuit," www.edn.com; May 1, 2003, 2 pgs.
Deuty, Scott, "AN1520/D—HDTMOS Power MOSFETs Excel in Synchronous Rectifier Applications," On Semiconductor, Feb. 2003, pp. 1-14.
Eagar, Dale, "High Efficiency Distributed Power Converter Features Synchronous Rectification," Linear Technology Magazine, Nov. 1997, pp. 21-23.
Lam, Barbara et al., National Aeronautics And Space Administration Contract No. NAS 7-918, Technical Support Package On PWM And Synchronous Rectifier Controller ASIC's for Jan. 1, 2002, NASA Tech Brief vol. 26, No. 1 from JPL New Technology Report NPO-30281, 3 pages.

(Continued)

*Primary Examiner*—Jessica Han
(74) *Attorney, Agent, or Firm*—Mark E. Scott; Conley Rose, PC

(57) ABSTRACT

Disclosed herein are various embodiments of power conversion systems and methods employing synchronous multi-phase AC-to-DC conversion. In one embodiment, a power converter comprises a transistor bridge and a switching controller that operates the transistor bridge in response to AC voltage threshold crossings. The switching controller may include a period counter to measure times between threshold crossings, and a delay counter to trigger a delayed state transition for the transistor bridge. One disclosed method embodiment comprises: receiving multiple phased alternating voltages; comparing each phased alternating voltage to a threshold; determining a period associated with voltage threshold crossings; triggering state transitions at some fraction of the period after each threshold crossing; and placing a transistor bridge into a configuration associated with a current state. For each state, the transistor bridge configuration is designed to couple phased alternating voltages to two output terminals in a sequence that produces a non-alternating voltage difference.

16 Claims, 4 Drawing Sheets

OTHER PUBLICATIONS

Mappus, Steve, Texas Instruments, "Predictive Gate Drive Boosts Synchronous DC/DC Power converter Efficiency," SLUA281, Apr. 2003, pp. 1-26.

Mappus, Steve, Texas Instruments, "Predictive Gate Drive Frequently Asked Questions," SLUA285, Feb. 2003, pp. 1-9.

Texas Instruments, "High-Efficiency Predictive Synchronous Buck Driver," SLUS486B, Jul. 2003, pp. 1-27.

Tolbert, Leon M. et al., "Electronic Power Conversion System For An Advanced Mobile Generator Set," pp. 1-6, (no date).

* cited by examiner

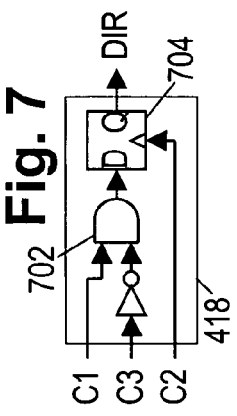
Fig. 7
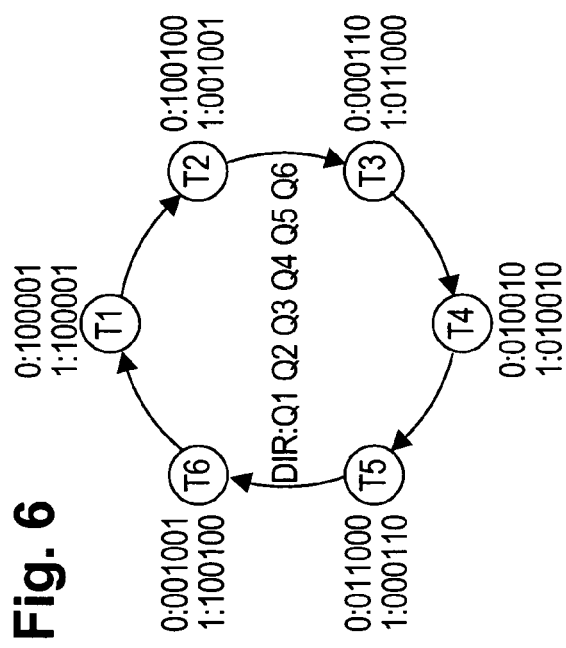
Fig. 6
Fig. 8

US 7,447,051 B2

SYNCHRONOUS MULTI-PHASE AC-TO-DC CONVERTER

CROSS-REFERENCE TO RELATED APPLICATIONS

The present application relates to co-pending U.S. Ser. No. 10/170,960, filed on Jun. 13, 2002, entitled, "Digital Adaptive Sensorless Commutational Drive Controller For A Brushless DC Motor," and incorporated herein by reference.

BACKGROUND

Electric motors convert electrical power into motion using the force-generating interaction between electrical currents and magnetic fields. Electrical power generators use this same interaction to convert motion into electrical power. A common configuration for both motors and generators is the "brushless direct current" (BLDC) configuration, in which permanent magnets are attached to an axle and surrounded by fixed wire coils. When a wire coil carries a current in one direction, it creates an oriented magnetic field that reverses when current flows in the opposite direction. The coil-generated magnetic fields create a torque on the permanent magnets, thereby spinning the axle. Conversely, spinning the axle causes the magnets to move past the surrounding coils, inducing a current in one direction as the magnetic field increases in one direction, and reversing the current as the magnetic field increases in the opposite direction.

For efficient continuous operation as an electrical motor, a controller switches the currents through the coils in sequence at the same rotational speed as the axle. Such "active" switching has been generally regarded as undesirable in the power generation context because a simple passive (i.e., diode bridge) rectifier generally suffices to extract DC power from a BLDC configuration. However, a passive rectifier limits the maximum power generation efficiency due to non-zero forward conduction voltages. Such efficiency losses become particularly significant for low voltage and/or low speed operation. Thus, it would be desirable to provide a device that enables high-efficiency, low-voltage power generation from a BLDC configuration.

SUMMARY

Accordingly, there is disclosed herein various embodiments of power conversion systems and methods employing synchronous multi-phase AC-to-DC conversion. One disclosed embodiment of an AC-to-DC converter comprises a transistor bridge and a switching controller that operates the transistor bridge in response to voltage threshold crossings on each AC line. The switching controller may include a period counter to measure times between threshold crossings, and a delay counter to trigger a delayed state transition for the transistor bridge after each threshold crossing.

One disclosed method embodiment comprises: receiving multiple phased alternating voltages; comparing each of the phased alternating voltages to a threshold; determining a period associated with threshold crossings by the phased alternating voltages; triggering state transitions at some fraction of the period after each threshold crossing; and placing a transistor bridge into a configuration associated with a current state. For each state, the transistor bridge configuration is designed to couple phased alternating voltages to two output terminals in a sequence that produces a non-alternating voltage difference.

Also disclosed is a power generator embodiment that comprises: a rotor, a stator, a transistor bridge, and a switching controller. The rotor is provided with two or more magnetic poles that induce phased alternating voltages in stator windings when the rotor turns. The transistor bridge couples a transistor bridge that couples the windings to two nodes. The switching controller enables and disables transistors in the transistor bridge in response to threshold crossings of the alternating voltages in a manner designed to produce a DC voltage difference between the two nodes.

A system controller is also disclosed herein. The system controller includes a switching controller and a bus. The switching controller is configured to operate a transistor bridge in response to voltage threshold crossings in phased alternating signals so as to convert the phased alternating signals into a non-alternating voltage. The bus is configured to couple the switching controller to a processor. The processor may be configured to monitor the frequency of the alternating signals and inhibit operation of the switching controller when the frequency is less than a predetermined value.

BRIEF DESCRIPTION OF THE DRAWINGS

For a detailed description of various invention embodiments, reference will now be made to the accompanying drawings in which:

FIG. 6 shows an illustrative state machine;

FIG. 7 shows an illustrative direction detector;

FIG. 8 shows an illustrative frequency discriminator;

NOTATION AND NOMENCLATURE

Certain terms are used throughout the following description and claims to refer to particular system components. As one skilled in the art will appreciate, those skilled in the art may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". In addition, the term "couple" or "couples" is intended to mean either an indirect or a direct connection. Thus, if a first device couples to a second device, that connection may be through a direct connection, or through an indirect electrical connection via other devices and connections.

Further, the state machine described herein in conjunction with various embodiments tracks states that may be referred to as commutational states or rotor position states. The term "rotor position" in this context refers to any of multiple rotor positions and orientations that correspond with a commutational state depending on the number of magnetic pole pairs in the rotor of the brushless DC generator. Hence, "rotor position" is not intended to be an exclusively determinative phrase in this context.

DETAILED DESCRIPTION

Figure 1:
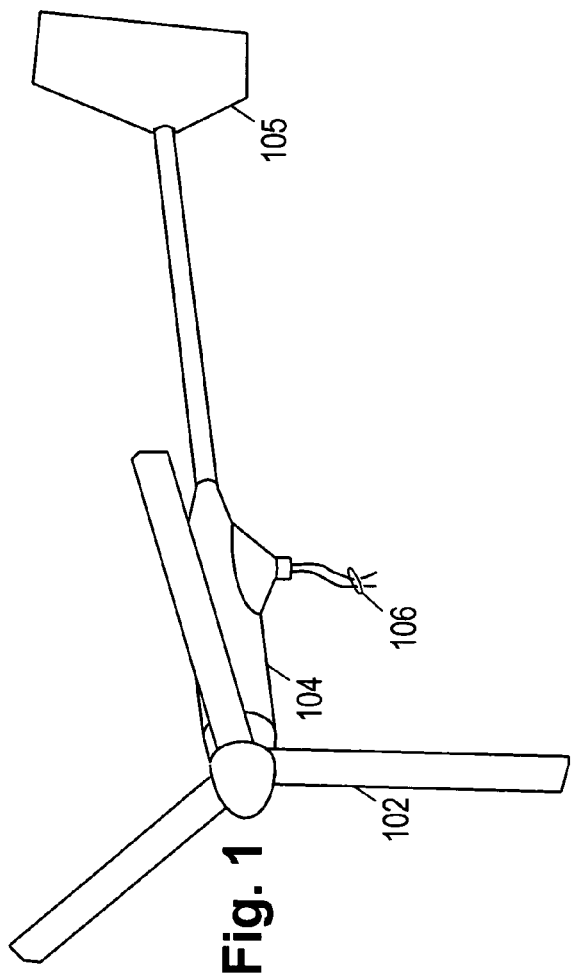
FIG. 1 shows an illustrative power generation environment.

FIG. 1 shows a windmill that may be used for power generation purposes. The windmill includes a rotatable set of vanes 102 mounted on a chassis 104. A tail 105 orients the vanes 102 generally into the wind, which causes the vanes to rotate. Rotation of the vanes 105 causes a generator in chassis 104 to produce power. The chassis 104 further includes an active synchronous rectifier for high efficiency conversion into direct current (DC) power on conductors 106.

Figure 3A:
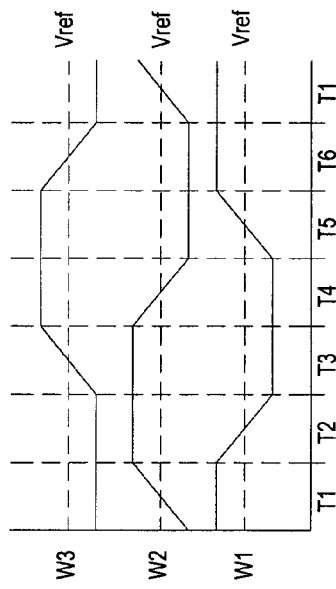
FIGS. 3A and 3B show illustrative winding voltage waveforms.
Figure 3B:
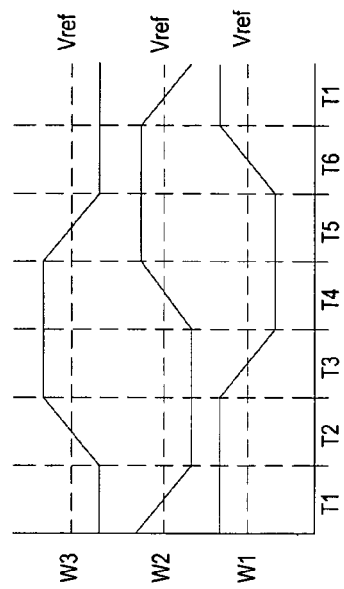
Figure 2:
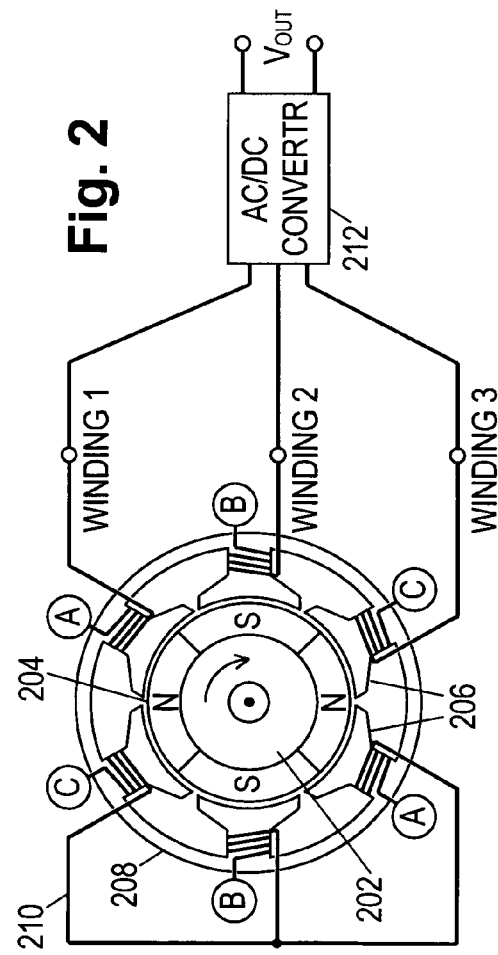
FIG. 2 shows an illustrative brushless DC generator configuration.

FIG. 2 shows an illustrative brushless DC (BLDC) generator configuration. Vanes 102 (or some other mechanical power source) cause rotor 202 (and the attached permanent magnets 204) to rotate relative to the surrounding windings 206, which are part of stator 208. Stator 208 contains six coils that are coupled in pairs to form three windings. (The nodes labeled "A" are coupled to each other, the nodes labeled "B" are coupled to each other, and the nodes labeled "C" are coupled to each other.) The three windings each couple a respective terminal to a common node 210. The rotor's rotation in the direction shown induces voltages in the windings as shown by the idealized waveforms in FIG. 3A. Rotation in the opposite direction would induce winding voltages as shown by the idealized waveforms in FIG. 3B.

An alternating current (AC) to direct current (DC) converter 212, as its name suggests, converts the winding voltages into a DC voltage at terminals $V_{OUT}$. The AC to DC converter 212 may be implemented using a transistor bridge that is switched in synchronization with the oscillation frequency of the winding voltages. Such an implementation may offer higher conversion efficiencies due to the elimination of power loss in diode bridges caused by forward conduction voltage drops.

Figure 4:
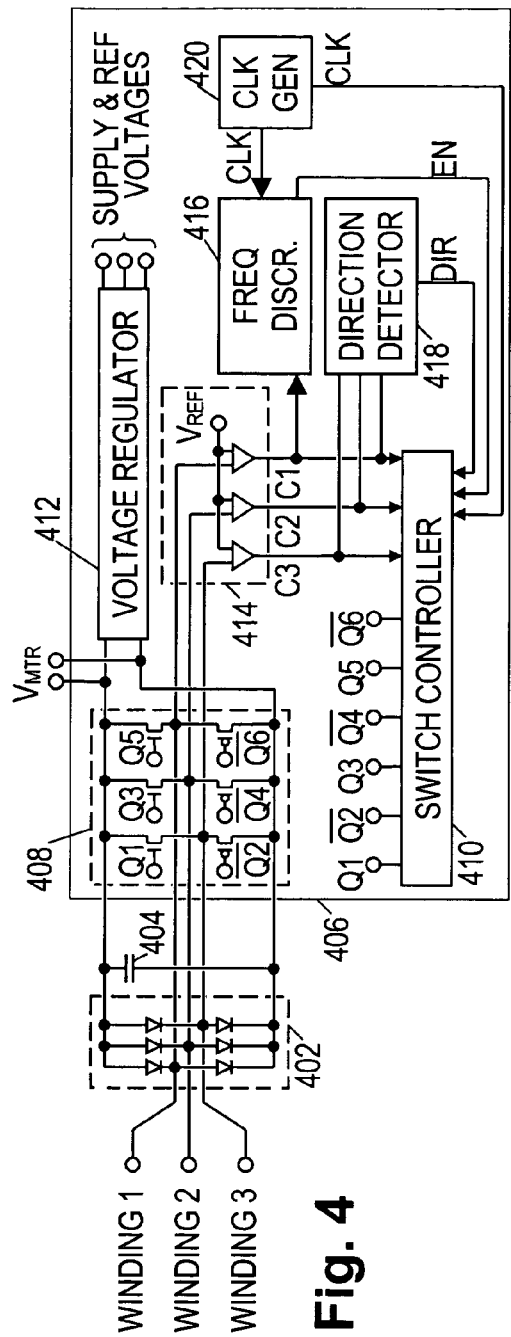
FIG. 4 shows an illustrative AC to DC converter configuration.

FIG. 4 shows an illustrative AC to DC converter configuration having a diode bridge 402, a capacitor 404, and an application specific integrated circuit (ASIC) 406. The ASIC 406 includes a transistor bridge 408, a switch controller 410, a voltage regulator 412, a set of comparators 414, a frequency discriminator 416, a direction detector 418, and a clock generator 420.

When ASIC 404 is not operating (e.g., at initial startup), diode bridge 402 operates as a passive rectifier to convert the alternating voltages on the windings into a DC voltage on capacitor 404 and between the terminals labeled $V_{MTR}$. When ASIC 404 is operating, the transistor bridge 408 performs low-loss AC to DC conversion under control of switch controller 410. Transistor bridge 408 couples each AC voltage line to each DC terminal with a respective power transistor. Each power transistor is enabled by assertion of a corresponding control signal.

Voltage regulator 412 converts the DC voltage from capacitor 404 into one or more regulated supply and reference voltages. The regulated voltages provide power to the various other components of AC to DC converter 406. Depending on the purpose of the generator, power may be supplied to other devices via the terminals labeled $V_{MTR}$, or via regulated supply voltage terminals coupled to voltage regulator 412. Any suitable voltage regulator configuration may be used.

Comparators 414 compare the winding voltages to a reference voltage $V_{REF}$, thereby producing digital compare signals C1-C3 to indicate whether the respective winding voltages are above or below the reference voltage. The reference voltage may be fixed (e.g., zero volts), or it may be an averaged winding voltage.

Frequency discriminator 416 compares the frequency of compare signal C1 to a threshold frequency, and asserts an enable signal EN when signal C1 has a frequency above the threshold. The comparison is performed with hysteresis, so that once the enable signal EN is asserted, the signal will remain asserted until the frequency of compare signal C1 falls below a second threshold frequency that is lower than the first threshold frequency.

Direction detector 418 determines the rotor's rotation direction from the order in which the compare signals C1-C3 change. Direction detector 418 asserts a direction signal DIR to indicate a first rotation direction, and de-asserts the direction signal to indicate the opposite rotation direction. The direction signal DIR indicates to the switch controller 410 the order in which the winding voltages change.

A clock generator 420 provides a clock signal CLK to the frequency discriminator 416 and to switch controller 410. The clock generator 420 may be crystal-oscillator based, but precision is not crucial to the operation of the AC to DC converter. Rather, the illustrated AC to DC converter is expected to be operable over a large range of clock frequencies. Consequently, the clock generator 420 may be based on an inverter ring architecture or any other suitable oscillator architecture.

Switch controller 410 receives digital signals C1-C3, enable signal EN, and direction signal DIR. From these signals, the switch controller 410 produces the switch control signals Q1-Q6 that are provided to corresponding power transistors in set 408. The assertion of a switch control signal Q1-Q6 causes the receiving power transistor to electrically couple one of the windings W1-W3 to one of the $V_{MTR}$ terminals. The switch timing is configured to bypass the diode bridge 402, thereby eliminating forward conduction losses in the diodes and boosting the overall efficiency of the system.

Figure 5:
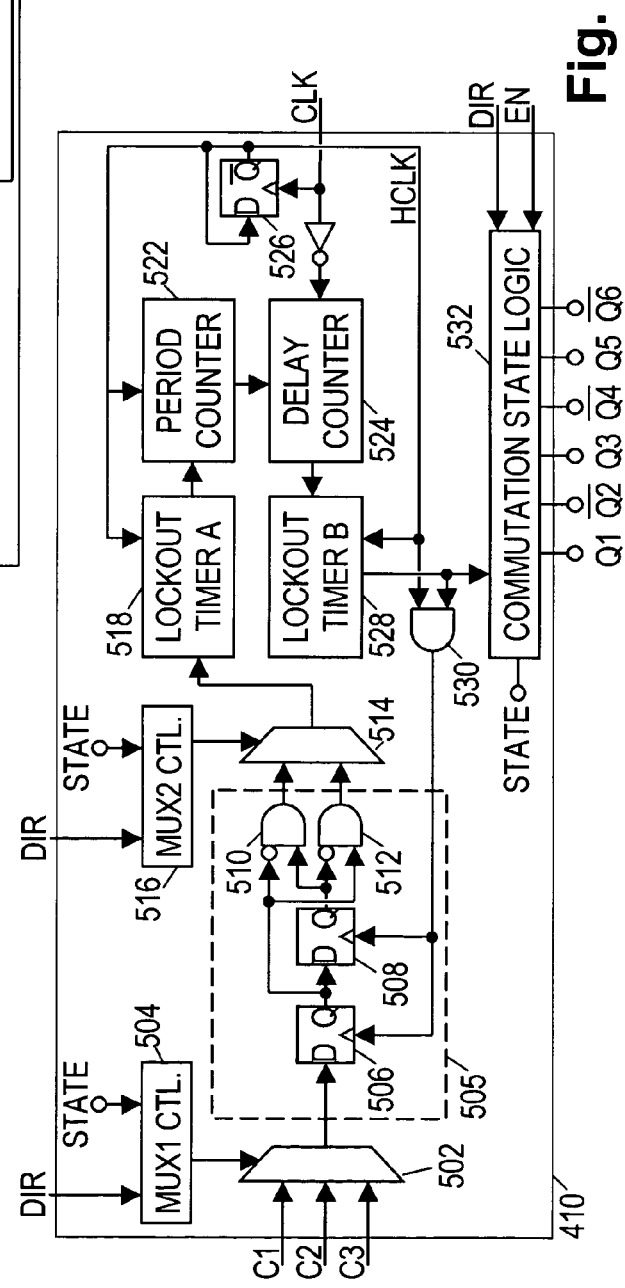
FIG. 5 shows an illustrative switch controller.

FIG. 5 shows an illustrative embodiment of the switching controller 410. A multiplexer 502 operates under control of a multiplexer controller 504 to forward a selected one of the digital signals C1-C3 to edge detector 505. The digital signal selected by controller 504 is the signal that is expected to have the next zero crossing. Controller 504 employs the direction signal DIR and the (multi-bit) state signal STATE to determine which signal is expected to have the next zero crossing.

Edge detector 505 includes a pair of flip-flops 506 and 508 that hold "current" and "past" samples of the digital signal forwarded by multiplexer 502. A pair of logic gates 510 and 512 compare the current and past samples to determine whether a negative transition (gate 510) or a positive transition (gate 512) has occurred. When a transition occurs, the appropriate gate produces a one-clock pulse.

A second multiplexer 514 operates under control of multiplexer controller 516 to forward an output signal from a selected one of the logic gates 510 and 512. Controller 516 employs the direction signal DIR and the state signal STATE to determine whether a positive or negative transition is expected, and causes multiplexer 514 to select the corresponding logic gate. The resulting edge detection signal is forwarded to lockout timer 518.

Lockout timer 518 asserts a synchronization signal upon receiving the first pulse of the edge detection signal, and holds the synchronization signal asserted for a timed interval after the first pulse, thereby blocking any subsequent pulses that may occur within the timed interval following the first pulse. Once the interval has expired, the synchronization signal is de-asserted, and the cycle repeats with the next received pulse. In this manner, lockout timer 518 prevents signal noise from causing multiple zero crossings to be detected where only a single transition is expected.

A period counter 522 times the interval between upward transitions of the synchronization signal received from the lockout timer. As each upward transition is received, the counter 522 passes the current count to delay counter 524 and begins counting again from zero. Delay counter 524 inverts the count received from period counter 522 and loads the inverted count. This inversion and loading occurs each time an upward transition is sent by lockout timer 518. As delay counter 524 reaches its maximum value and "rolls-over" to zero, it generates a commutation pulse. The delay counter 524 keeps counting, and, in the absence of another zero-crossing pulse, eventually rolls over again and again, periodically generating additional commutation pulses. Such periodic commutation pulses allow counter 524 to double as a starting mechanism when switch controller 410 is used as a motor controller.

Flip-flop 526 operates as a clock divider. Flip-flop 526 receives clock signal CLK, and produces a half-rate clock signal HCLK. Clock signal CLK drives the operation of delay counter 524, while the various other components of switch controller 410 (including edge detector 505, lockout timer 518, period counter 522, and lockout timer 528) employ the half-rate clock HCLK. Because delay counter 524 runs at twice the speed of period counter 522, delay counter 524 measures an interval that is half of the interval measured by period counter 524. This relationship causes the commutation pulse to be generated approximately half-way between zero crossings.

A lockout timer 528 receives the commutation pulses and generates a switch signal. Lockout timer 528 asserts the switch signal upon receiving a first commutation pulse, and holds the switch signal asserted for a timed interval, thereby blocking any subsequent commutation pulses that may occur during the timed interval. At the expiration of the timed interval, the lockout timer 528 de-asserts the switch signal, and the cycle repeats when the lockout timer 528 receives the next commutation pulse. Lockout timer 528 serves to limit the rate at which commutation can occur.

Lockout timer 528 provides the switch signal to a logic gate 530 and to commutation state logic 532. Logic gate 530 operates to gate the clock signal HCLK to edge detector 505, effectively enabling the edge detector only for a timed interval after an upward transition in the switch signal. The gate 530 thus creates a window for the detection of zero crossings, thereby reducing the opportunity for signal noise to prematurely commutate the switch controller state.

Commutation state logic 532 produces the multi-bit state signal STATE in response to the switch signal, the direction signal DIR, and the enable signal EN. The switch signal causes the commutation state logic 532 to cycle through the available state, incrementing once for each upward transition of the switch signal. The direction signal DIR is used to determine the appropriate set of switch control signals Q1-Q6 for each state. The enable signal EN, when de-asserted, forces the switch control signals Q1-Q6 into a state that disables the transistors 408. When asserted, the enable signal EN allows the commutation state logic 532 to generate the switch control signals Q1-Q6 associated with the current state and direction signal DIR.

FIG. 6 shows a state machine having six states T1-T6. Associated with each state is a set of control signal values Q1-Q6 that are conditioned on the value of direction signal DIR. For example, in state T2, the following control signal values are provided by commutation state logic 532 when direction signal DIR is de-asserted:

| | | |
|---|---|---|
| Q1 = 1 | Q3 = 0 | Q5 = 0 |
| Q2 = 0 | Q4 = 1 | Q6 = 0 |

The assertion of control signals Q1 and Q5 causes the associated transistors in set 408 to conduct (unless enable signal EN is de-asserted), while the transistors associated with the other control signals are open. When direction signal DIR is asserted, the control signals associated with state T2 are:

| | | |
|---|---|---|
| Q1 = 0 | Q3 = 1 | Q5 = 0 |
| Q2 = 0 | Q4 = 0 | Q6 = 1 |

Switch controller 410 is closely related to the brushless DC motor controller disclosed in U.S. patent application Ser. No. 10/170,960, filed Jun. 13, 2002, by inventor James E. Masino, said application being hereby incorporated by reference herein. Indeed, with power being supplied to the $V_{MTR}$ terminals, ASIC 406 will also function as a brushless DC motor controller. In some applications, ASIC 406 may double as both a AC to DC converter and as a motor controller. For example, in one embodiment, ASIC 406 may be used to drive a brushless DC motor to store energy in a spring, a rotating flywheel, or an elevated mass. The process may then be reversed as the spring, flywheel, or elevated mass causes rotor rotation, allowing ASIC 406 to convert mechanical energy into electrical energy. Depending on the application, switch controller 410, in going from motor controller mode to AC to DC conversion mode, may switch control signals Q1 with Q2, Q3 with Q4, and Q5 with Q6, so as to preserve the voltage polarity of terminals $V_{MTR}$.

FIG. 7 shows an illustrative implementation of direction detector 418 (FIG. 4). A logic gate 702 determines whether digital signal C1 is high while digital signal C3 is low. A flip-flop 704 captures the output of gate 702 when digital signal C2 transitions downward. When the rotor rotates in one direction to produce the winding voltages shown in FIG. 3A, digital signal C2 transitions downward during state T4, while digital signal C1 is low and digital signal C3 is high. Flip-flop 704 captures and holds a "0" as the value of the direction signal DIR. When the rotor rotates in the opposite direction to produce the winding voltages shown in FIG. 3B, digital signal C2 transitions downward during state T1, where digital signal C1 is high and digital signal C3 is low. Flip-flop 704 captures and holds "1" as the value of the direction signal DIR.

FIG. 8 shows an illustrative implementation of frequency discriminator 416 (FIG. 4). A pair of flip-flops 802 and 804 respectively capture "present" and "past" samples of digital signal C1. A logic gate 806 asserts a negative edge detection signal when the past sample is high while the present sample is low. The negative edge detection signal is provided as a "clear" input to flip-flop 808, as a clock input to flip-flop 810, and as a "load" input to timer 814.

The negative edge detection signal's assertion clears input flip-flop 808, de-asserting output Q. At the same time that the negative edge detection signal initiates the clearing of input flip-flop 808, the negative edge detection signal causes output flip-flop 810 to capture the pre-existing value of output Q from input flip-flop 808. If input flip-flop 808 has not changed since the previous assertion of the negative edge detection signal, the pre-existing value is low. Conversely, if input flip-flop 808 has been changed, the pre-existing value is high. Correspondingly, the enable signal EN will be low or high.

The negative edge detection signal's assertion causes timer 814 to load a predetermined count. Timer 814 counts continuously, rolling over when a maximum count is reached. Timer 814 provides the rollover signal to logic gate 816, which passes clock signal CLK while the rollover signal is asserted. The output of logic gate 816 repeatedly presets flip-flop 808, causing output Q to be asserted high, until another assertion of the negative edge detection signal reaches timer 814.

As previously noted, an assertion of the negative edge detection signal causes timer 814 to load a predetermined value. The loading operation also resets the rollover signal, preventing flip-flop 808 from being preset until the timer 814 rolls over. If the timer 814 rolls over before the subsequent assertion of the negative edge detection signal, input flip-flop 808 will be preset and the enable signal EN will be asserted. On the other hand, if the subsequent assertion of the negative edge detection signal arrives before timer 814 rolls over, input flip-flop 808 remains cleared and enable signal EN will be de-asserted.

Enable signal EN is also provided to timer 814. Timer 814 is programmed for one predetermined delay when enable signal EN is de-asserted, and programmed for a longer delay when enable signal EN is asserted. Thus, frequency discriminator 416 exhibits a hysteresis, asserting enable signal EN after the frequency of compare signal C1 exceeds a first frequency threshold, and keeping the enable signal EN asserted until the frequency falls below a second, lower frequency threshold.

Figure 9:
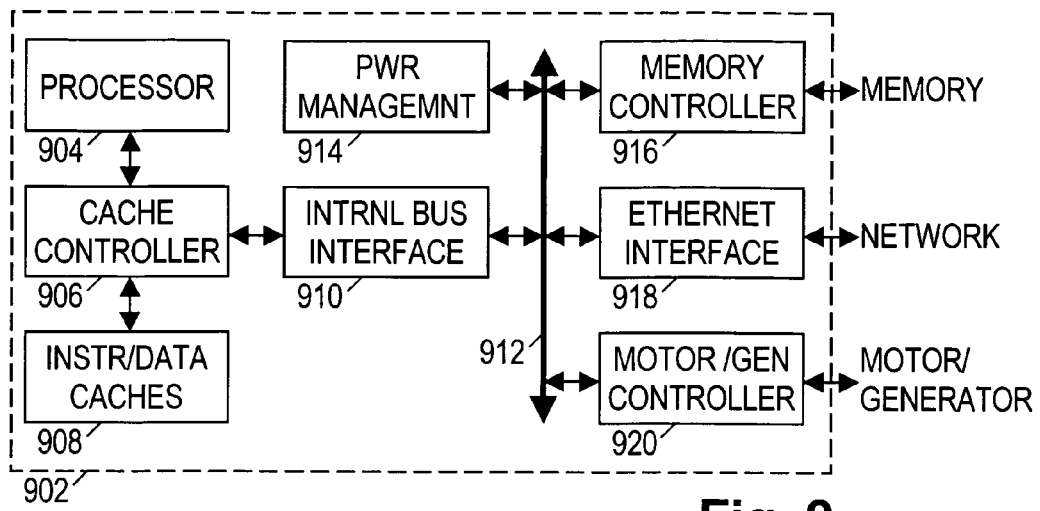
FIG. 9 shows an illustrative digital system containing a motor/generator controller.

FIG. 9 shows an illustrative microcontroller 902 having an integrated peripheral 920 for operating a brushless DC motor/generator. Microcontroller 902 includes a processor core 904, a cache controller 906, one or more caches 908, an internal bus interface 910, an internal bus 912, a power management unit 914, a memory controller 916, a network interface 918, and motor/generator controller 920. The processor core 904 operates on data in accordance with stored instructions. The data and instructions are retrieved by cache controller 906 and supplied to processor core 904. Cache controller 906 may cache the data and instructions in accordance with a predetermined cache algorithm to minimize processor wait time. The instructions may be stored in a separate memory along with data. The data and/or the instructions may additionally or alternatively be retrieved from other sources. Cache controller 906 accesses on-chip peripherals and off-chip components via internal bus interface 910 and internal bus 912.

Microcontroller 902 may include a variety of peripherals that customize microcontroller 902 to particular applications. The illustrative embodiment of FIG. 9 includes a power management unit 914 which may be configured to adjust the clock rate to reduce power consumption during periods of reduced computing demand. Also included is a memory controller 916 which may be configured to interface with external memory chips using an appropriate control protocol. A network interface 918 (such as, e.g., an Ethernet interface) may be included to allow microcontroller 902 to support communications with a network. Significantly, one or more brushless DC motor/generator controllers 920 may also be included as on-chip peripherals to allow microcontroller 902 to control operation of a brushless DC motor/generator without introducing an undue computational load on processor core 904. Controller 920 may include one or more registers to which processor core 904 can write parameters (such as speed and direction) to control the operation of controller 920. Controller 920 may be coupled via drive switches to the windings of the brushless DC motor/generator to be controlled.

Though shown in the form of a microcontroller peripheral in FIG. 9, brushless DC motor/generator controller 920 may alternatively be incorporated as integrated support circuitry to other integrated electronic devices including without limitation microprocessors and digital signal processors. In yet another embodiment, brushless DC motor/generator controller 920 may be incorporated as a discrete component (e.g., on an expansion card) in a larger system such as, e.g., a desktop computer.

Figure 10:
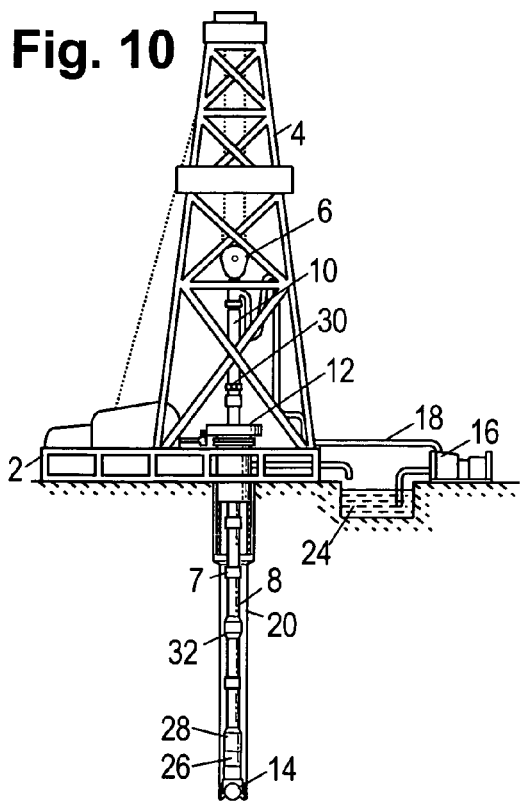
FIG. 10 shows another illustrative power generation environment.

FIG. 10 shows a representative well during drilling operations. A drilling platform 2 is equipped with a derrick 4 that supports a hoist 6. Drilling of oil and gas wells is typically carried out with a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated by rotating the drill string 8 or by operating a downhole motor near the drill bit. The rotation of the bit 14 extends the borehole.

Drilling fluid is pumped by recirculation equipment 16 through supply pipe 18, through drilling kelly 10, and down through the drill string 8 at high pressures and volumes to emerge through nozzles or jets in the drill bit 14. The drilling fluid then travels back up the hole via the annulus between the exterior of the drill string 8 and the borehole wall 20, through the blowout preventer (not specifically shown), and into a mud pit 24 on the surface. On the surface, the drilling fluid is cleaned and then recirculated by recirculation equipment 16. The drilling fluid cools the drill bit 14, carries drill cuttings to the surface, and balances the hydrostatic pressure in the rock formations.

Downhole instrument sub 26 may be coupled to a telemetry transmitter 28 that communicates with the surface to provide telemetry signals and receive command signals. A surface transceiver 30 may be coupled to the kelly 10 to receive transmitted telemetry signals and to transmit command signals downhole. Alternatively, the surface transceiver may be coupled to another portion of the rigging or to drillstring 8. One or more repeater modules 32 may be provided along the drill string to receive and retransmit the telemetry and command signals. The surface transceiver 30 is coupled to a logging facility (not shown) that may gather, store, process, and analyze the telemetry information.

The electronics employed in the downhole instrument sub 26 are configured to operate at the elevated temperatures experienced downhole. Because the electronics are resident in the borehole for only a limited time, the electronics may be shielded from the elevated temperatures by insulation, heat-absorbing materials, and/or active refrigeration. These traditional approaches to configuring electronics for elevated temperature operation have been motivated by the poor performance of many electronics when they are directly exposed to environments with temperatures above 185° C. However, these approaches greatly increase the size of the electronics package, and in the case of active refrigeration, greatly increase the energy consumption by the electronics package. Further, these approaches have not suggested a solution for providing electronics that can remain resident in a well indefinitely. Accordingly, the electronics, and the AC to DC converter in particular, may be fabricated using silicon-on-insulator (SOI) or silicon-on-sapphire (SOS) technology to obtain reliable performance at temperatures above 185° C.

In the downhole environment brushless DC motors and generators having embodiments of the disclosed controllers may be employed downhole. The reliable start-up and high-temperature operation provided by the disclosed controller embodiments may be particularly advantageous for use in downhole applications due to the substantial amount of effort and time (and associated equipment rental costs) required to put the tool at the desired location. Motors (with their controllers) may be employed to open and close ports, extend arms, take core samples, move fluids, and to perform various other activities. Generators (with their controllers) may be employed to convert a drilling fluid flow or a production fluid flow into electrical power for instrumentation and tools.

Other elevated temperature environments exist where the disclosed controllers may be suitable. For example, internal combustion engines generally provide a high temperature, high vibration environment that is hostile to conventional electronics. The disclosed controllers may be particularly suitable for operating in such environments.

The disclosed AC to DC converter may enable more efficient operation, particularly in low voltage applications, e.g., applications where the magnitude of the winding voltage is limited to less than two volts. Low voltage operation may be desired where size, weight or cost is an issue. Size, weight, and cost may be reduced by reducing the number of turns in each winding of a brushless DC motor/generator. Alternatively, reliability may be enhanced if the brushless DC generator operates at a lower speed (and voltage). Low voltage applications of the disclosed controllers include windmills, regenerative braking systems, and portable generators. The controller's power requirements may be minimized using complementary transistor techniques, and the temperature tolerance may be increased using silicon-on-insulator (SOI) or silicon-on-sapphire (SOS) fabrication technology.

The above discussion is meant to be illustrative of the principles and various embodiments of the present invention. For example, the disclosed controller embodiments were described in the context of a four-pole three-phase brushless DC motor/generator. Configurations with a greater or lesser number of poles, and a greater or lesser number of winding phases are contemplated. Numerous other variations and modifications will become apparent to those skilled in the art once the above disclosure is fully appreciated. It is intended that the following claims be interpreted to embrace all such variations and modifications.

What is claimed is:

1. An alternating current (AC) to direct current (DC) converter that comprises:
    a transistor bridge coupled to multiple AC lines to two DC lines, each AC line coupled to each DC line by at least one transistor;
    a switching controller configured to control the transistor bridge in response to voltage threshold crossings on each AC line;
    a set of comparators where each comparator is configured to compare a respective AC line voltage to a threshold value to generate a compare signal; and
    a direction detector configured to process the compare signals to generate an order signal to indicate an order in which the AC line voltages cross the threshold value.

2. An alternating current (AC) to direct current (DC) converter that comprises:
    a transistor bridge coupled to multiple AC lines to two DC lines, each AC line coupled to each DC line by at least one transistor;
    a switching controller configured to control the transistor bridge in response to voltage threshold crossings on each AC line;
    a set of comparators where each comparator is configured to compare a respective AC line voltage to a threshold value to generate a compare signal; and
    wherein the switching controller includes:
        commutation state logic configured to determine a current state for the transistor bridge; and
        an edge detector configured to detect a transition in a compare signal associated with the current state.

3. The converter of claim 2, wherein the switching controller further includes:
    a direction selector coupled to the edge detector and configured to limit transition detection to those transitions occurring in an expected direction associated with the current state.

4. The converter of claim 2, wherein the switching controller further includes:
    a period counter configured to measure each interval between adjacent transition detections.

5. The converter of claim 4, wherein the switching controller further includes:
    a delay counter configured to determine a delay that is a predetermined fraction of a previous interval measured by the period counter,
    wherein the commutation state logic determines a subsequent state for the transistor bridge upon expiration of said delay.

6. The converter of claim 5, wherein the switching controller further includes:
    a gate coupled to the edge detector and configured to prevent transition detection during said delay.

7. The converter of claim 2, wherein the switching controller is configured to implement in an integrated circuit operable above 185° C.

8. The converter of claim 2, wherein the magnitude of the AC line voltages is less than two volts.

9. The converter of claim 2, wherein the switching controller is configured to implement in a CPLD.

10. An alternating current (AC) to direct current (DC) converter that comprises:
    a transistor bridge coupled to multiple AC lines to two DC lines, each AC line being coupled to each DC line by at least one transistor;
    a switching controller configured to control the transistor bridge in response to voltage threshold crossings on each AC line;
    a frequency discriminator configured to disable the switching controller while the voltage on the AC lines alternates below a predetermined frequency threshold.

11. The converter of claim 10, wherein the frequency discriminator is configured to provide hysteresis.

12. The converter of claim 10, wherein the frequency discriminator includes:
    an input flip-flop is configured to set in response to voltage threshold crossings of an AC line;
    a timer is configured to initialize in response to voltage threshold crossings of the AC line, wherein the timer is configured to reset the input flip-flop after a delay expires; and
    an output flip-flop configured to store the state of the input flip-flop in response to voltage threshold crossings of an AC line.

13. An alternating current (AC) to direct current (DC) converter that comprises:
    a transistor bridge coupled to multiple AC lines to two DC lines, each AC line being coupled to each DC line by at least one transistor;

a switching controller configured to control the transistor bridge in response to voltage threshold crossings on each AC line; and a diode bridge coupled to the multiple AC lines to the two DC lines, wherein the diode bridge is configured to rectify the AC voltages when the transistor bridge is not operating.

14. A system controller that comprises an integrated circuit having:

a switching controller configured to operate a transistor bridge in response to voltage threshold crossings in phased alternating signals so as to convert the phased alternating signals into a non-alternating voltage;

a frequency discriminator configured to disable the switching controller while the voltage on the phased alternating signals alternates below a predetermined frequency threshold; and a bus configured to couple the switching controller to a processor.

15. The controller of claim 14, wherein the integrated circuit further includes a processor coupled to the switching controller via the bus, and configured to retrieve from the switching controller a frequency value associated with the phased alternating signals.

16. A method of creating a non-alternating voltage difference between two terminals, the method comprising:

receiving multiple phased alternating voltages;

comparing each of the phased alternating voltages to a threshold;

determining a period associated with threshold crossings by the phased alternating voltages and whether a frequency of the phased alternating voltages is below a threshold;

triggering state transitions at some fraction of the period after each threshold crossing;

placing a transistor bridge into a configuration associated with a current state, the transistor bridge configuration being designed to couple phased alternating voltages to the two terminals in a sequence that produces the non-alternating voltage difference; and inhibiting operation of the transistor bridge while the frequency is below the threshold.

* * * * *